US009199519B2

(12) United States Patent
Bonacini

(10) Patent No.: US 9,199,519 B2
(45) Date of Patent: Dec. 1, 2015

(54) DEVICE FOR LOCKING WHEEL RIMS FOR VEHICLES ON REPAIR WORKSHOP MACHINES, PARTICULARLY TIRE-CHANGING MACHINES OR THE LIKE

(75) Inventor: Maurizio Bonacini, Correggio (IT)

(73) Assignee: GIULIANO Group S.p.A., Correggio (RE) (IT)

( * ) Notice: Subject to any disclaimer, the term of this patent is extended or adjusted under 35 U.S.C. 154(b) by 1076 days.

(21) Appl. No.: 13/199,602

(22) Filed: Sep. 2, 2011

(65) Prior Publication Data

US 2012/0055636 A1    Mar. 8, 2012

(30) Foreign Application Priority Data

Sep. 3, 2010    (IT) .............................. MO2010A0250

(51) Int. Cl.
*B60C 25/138* (2006.01)
*B60C 25/05* (2006.01)
*G01M 1/04* (2006.01)
*B60C 25/135* (2006.01)

(52) U.S. Cl.
CPC ........... *B60C 25/138* (2013.01); *B60C 25/0545* (2013.04); *G01M 1/045* (2013.01); *B60C 25/135* (2013.01)

(58) Field of Classification Search
CPC .. B60C 25/132; B60C 25/135; B60C 25/0545
USPC ..................................................... 157/14–21
See application file for complete search history.

(56) References Cited

U.S. PATENT DOCUMENTS

| | | | | |
|---|---|---|---|---|
| 5,088,539 A | * | 2/1992 | Mannen et al. ............. | 157/1.17 |
| 5,257,561 A | * | 11/1993 | Folta ............................. | 82/165 |
| 5,719,331 A | * | 2/1998 | Delmoro ........................ | 73/146 |
| 6,308,566 B1 | * | 10/2001 | Matsumoto et al. ........... | 73/462 |
| 6,516,855 B2 | * | 2/2003 | Corghi ............................ | 157/14 |
| 6,988,397 B1 | * | 1/2006 | Delmoro et al. ................ | 73/146 |
| 8,408,273 B2 | * | 4/2013 | Bonacini ...................... | 157/1.17 |
| 8,424,584 B2 | * | 4/2013 | Bonacini ...................... | 157/1.17 |
| 2001/0042602 A1 | * | 11/2001 | Corghi ............................ | 157/14 |
| 2008/0017324 A1 | * | 1/2008 | Bonacini ...................... | 157/1.28 |

FOREIGN PATENT DOCUMENTS

| | | |
|---|---|---|
| EP | 1 157 861 | 11/2001 |
| EP | 1 612 064 | 1/2006 |

OTHER PUBLICATIONS

Italian Search Report dated Mar. 18, 2011 in Italian Application No. MO2010A000250 (With relevant parts in English).

* cited by examiner

*Primary Examiner* — Hadi Shakeri
*Assistant Examiner* — Danny Hong
(74) *Attorney, Agent, or Firm* — Collard & Roe, P.C.

(57) ABSTRACT

A device for locking wheel rims for vehicles on repair workshop machines, has a supporting structure rotating around a work axis with a repair workshop machine or the like and has a resting portion for a wheel rim for vehicles, a locking element removably connected to a fastening element on the supporting structure, and a movement arrangement. The movement arrangement has a main actuator cylinder with fluid operation suitable for moving the fastening element from a release position, wherein the locking element is disengaged from the rim, to a retention position, wherein the locking element is engaged on the rim, an auxiliary actuator cylinder with fluid operation suitable for moving the fastening element from the release position to the retention position of the rim, and a feeding mouth for a fluid connected to one of the main actuator cylinder and the auxiliary actuator cylinder.

24 Claims, 6 Drawing Sheets

DEVICE FOR LOCKING WHEEL RIMS FOR VEHICLES ON REPAIR WORKSHOP MACHINES, PARTICULARLY TIRE-CHANGING MACHINES OR THE LIKE

CROSS REFERENCE TO RELATED APPLICATIONS

Applicant claims priority under 35 U.S.C. §119 of Italian Application No. MO2010A000250 filed Sep. 3, 2010, the disclosure of which is incorporated by reference.

BACKGROUND OF THE INVENTION

The present invention relates to a device for locking wheel rims for vehicles on repair workshop machines, particularly tire-changing machines or the like.

The use is known of so-called tire-changing machines which allow fitting and removing tires onto and off the relative rim of a vehicle wheel, e.g., for carrying out maintenance jobs or replacing the rim and/or the tire itself. Such tire-changing machines generally consist of a base structure supporting a chuck for gripping and rotating the rim of a wheel and of at least a tool bearing arm having one or more tools suitable for removing and/or fitting the tire from and onto the rim.

Different known types of chucks exist. A first type consists of a fastening plate for the rim, which is fitted on the base structure of the tire-changing machine in a rotatable way around a central work axis and which has four rim gripping clamps. The clamps move from the center towards the outside of the plate and vice versa, between a closing configuration, corresponding to the positioning of the clamps at the centre of the plate, and an opening configuration, corresponding to the positioning of the clamps at the edge of the plate. Such type of chuck is not without drawbacks. In particular, the clamps are subject to breakage and the actuators for moving the clamps themselves are subject to faults.

A second type of chuck comprises a resting plate for the rim, which is fitted on the base structure of the tire-changing machine in a way rotatable around a central work axis and which has a threaded hole inside which a rim lock pin can be fitted and screwed.

The lock pin has a thread along its entire length and has, in particular, an extremal portion that can be fitted and screwed inside the hole on the resting plate, through the central hole passing through the rim, and a grip handle opposite such extremal portion.

A lock cone is coupled to the pin in an axially rotatable manner. The lock cone has suitable grip knobs, suitable for engaging on the rim in correspondence to the central hole passing through the retention of the rim itself on the resting plate.

During use, the rim is positioned on the resting plate, with the central hole of the rim aligned with the threaded hole on the plate. The above extremal portion of the pin is screwed inside the hole on the plate, until the cone is positioned in contact or in any case in the proximity of the rim, above this. The screwing up of the cone on the pin, done by means of the knobs, allows positioning the cone itself in contact with the rim, inside the through hole, and therefore allows locking the rim on the resting plate.

Once the rim has been locked on the retention plate, this is caused to rotate around the central work axis. This type of chuck does however have a number of drawbacks. In particular, the action of locking the rim on the resting plate must be done manually, by screwing the cone on the rim itself, with consequent considerable physical effort on the part of the operator.

To overcome this problem, a further type of chuck is known comprising an actuator cylinder suitable for moving the pin, and therefore the cone screwed onto it, towards the rim, to lock this on the resting plate. Also this type of chuck does however have a number of drawbacks. For effective locking during all fitting/removal operations performed on the wheel in fact, a considerable force must be applied to the rim and, consequently, the use is required of an actuator cylinder of considerable dimensions. This consequently means the chuck takes up a fairly large amount of room, and that the means provided to make the chuck itself rotate during the fitting/removal operations on the wheel are more complex.

SUMMARY OF THE INVENTION

The object of the present invention is to provide a device for locking wheel rims for vehicles on repair workshop machines, particularly tire-changing machines or the like, which has reduced dimensions. Another object of the present invention is to provide a device for locking wheel rims for vehicles on repair workshop machines, particularly tire-changing machines or the like, that allows to overcome the mentioned drawbacks of the state of the art in the ambit of a simple, rational, easy and effective to use as well as low cost solution.

The above objects are achieved by the present device for locking wheel rims for vehicles on repair workshop machines, particularly tire-changing machines or the like, comprising at least a supporting structure rotatably associated around at least a work axis with a repair workshop machine or the like and having at least a resting portion for the wheel rim for vehicles, at least a locking element associable in a removable way with at least a fastening element on said supporting structure, and at least a movement arrangement having a main actuator cylinder with fluid operation suitable for moving said fastening element from a release position wherein the locking element is disengaged from the rim, to a retention position, wherein the locking element is engaged on the rim. The movement arrangement comprises:
  at least an auxiliary actuator cylinder with fluid operation suitable for moving the fastening element from the release position to a retention position of the rim; and
  at least a feeding mouth of a fluid connected to at least one between said main actuator cylinder and said auxiliary actuator cylinder.

BRIEF DESCRIPTION OF THE DRAWINGS

Other characteristics and advantages of the present invention will become more evident from the description of a preferred, but not sole, embodiment of a device for locking wheel rims for vehicles on repair workshop machines, particularly tire-changing machines or the like, illustrated purely as an example but not limited to the annexed drawings in which.

DETAILED DESCRIPTION OF THE EMBODIMENTS

Figure 1:
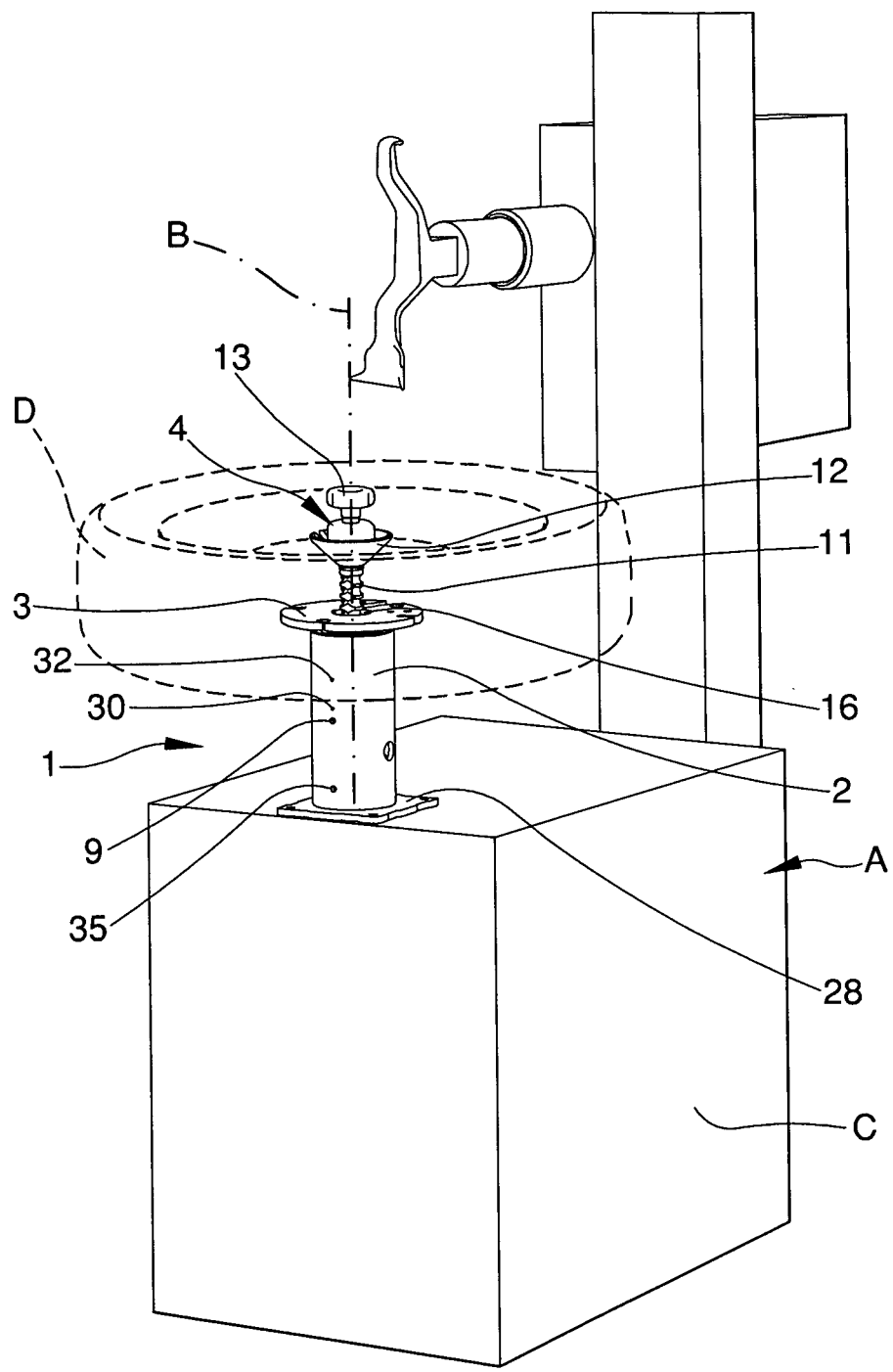
FIG. 1 is an axonometric view of the device for locking wheel rims for vehicles according to the invention fitted onto a tire-changing machine.
Figure 2:
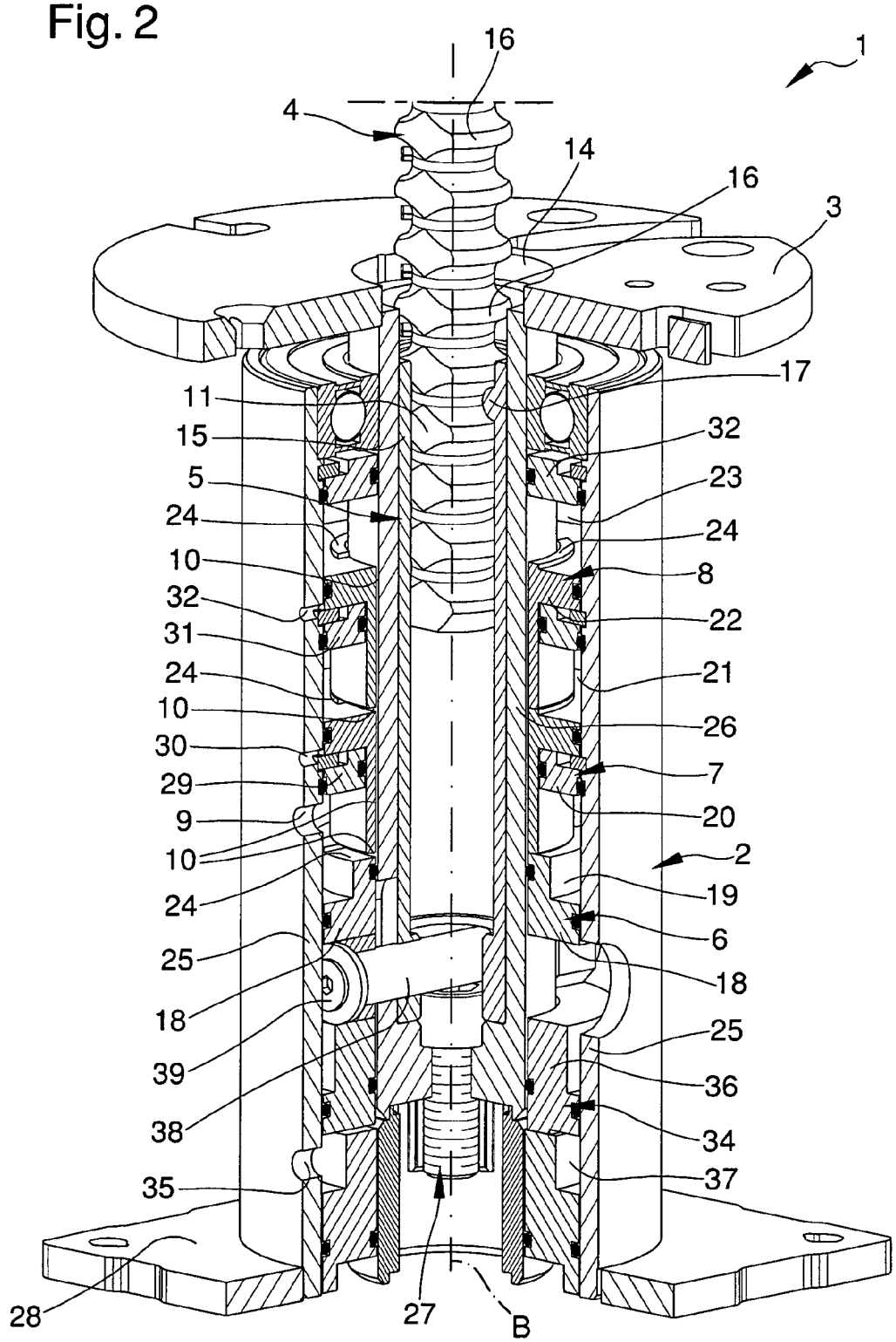
FIG. 2 is an axonometric and partial section view of the device according to the invention.

With particular reference to such figures, globally indicated by 1 is a device for locking wheel rims for vehicles on repair workshop machines. In particular, FIG. 1 shows the use of the device 1 for locking a wheel on a machine A of the type of a tire-changing machine. The use of the device 1 on different machines cannot however be ruled out.

The device 1 comprises a supporting structure 2 extending substantially vertically and which can be fastened to the base C of the machine A. The supporting structure 2 has a resting portion 3 for the rim of a wheel D for vehicles which is associable in rotation around a work axis B with the rotation means of the machine A.

The resting portion 3 is made up of a resting plate substantially at right angles to the work axis B. The rotation means of the machine A are not shown in the illustrations because they are of the conventional type and comprise a vertical spindle rotatable around the work axis B driven by motor means housed in the base C of the machine A.

Figure 5:
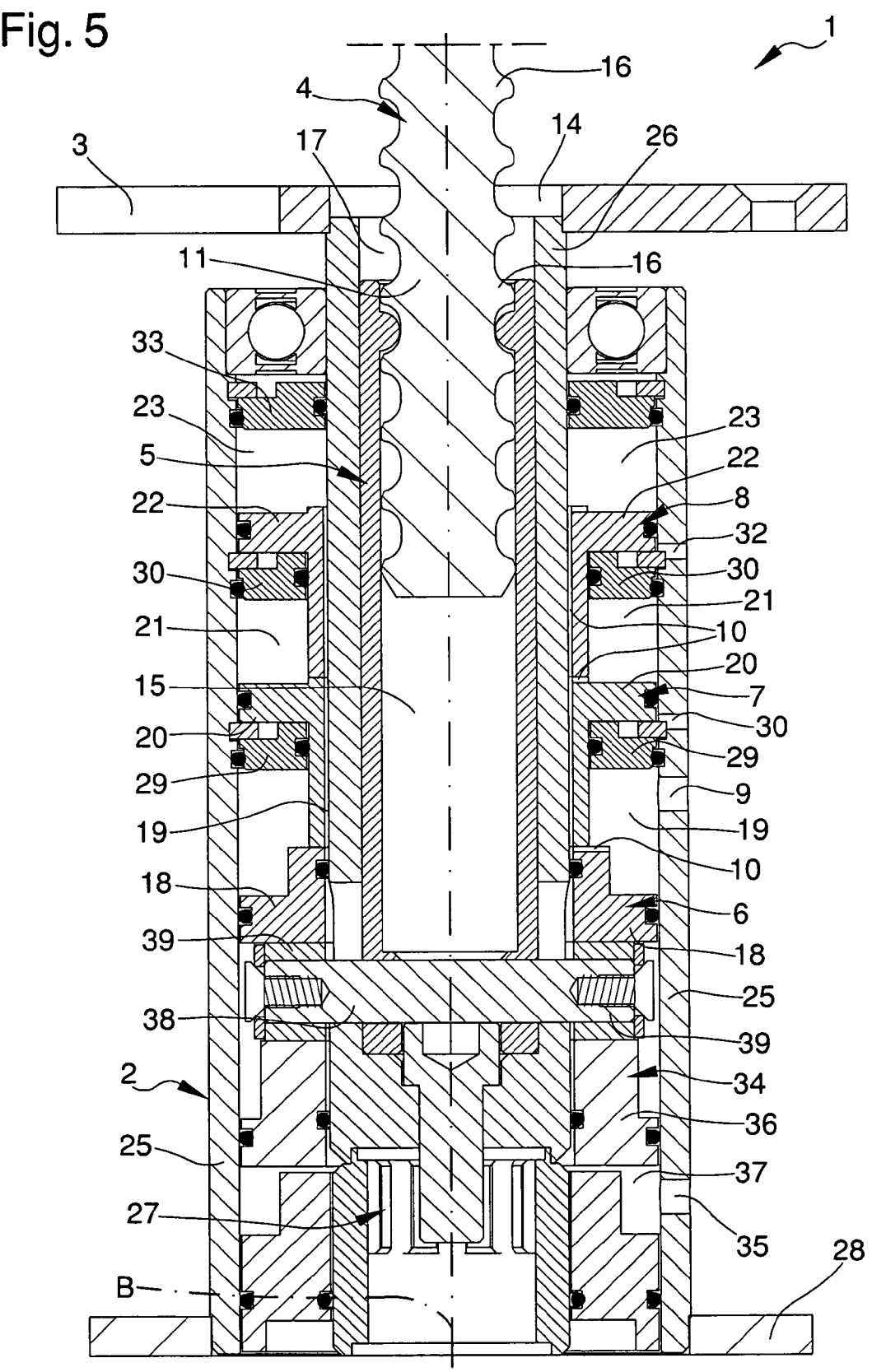
FIG. 5 is a side section view of the device according to the invention in the retention position.
Figure 6:
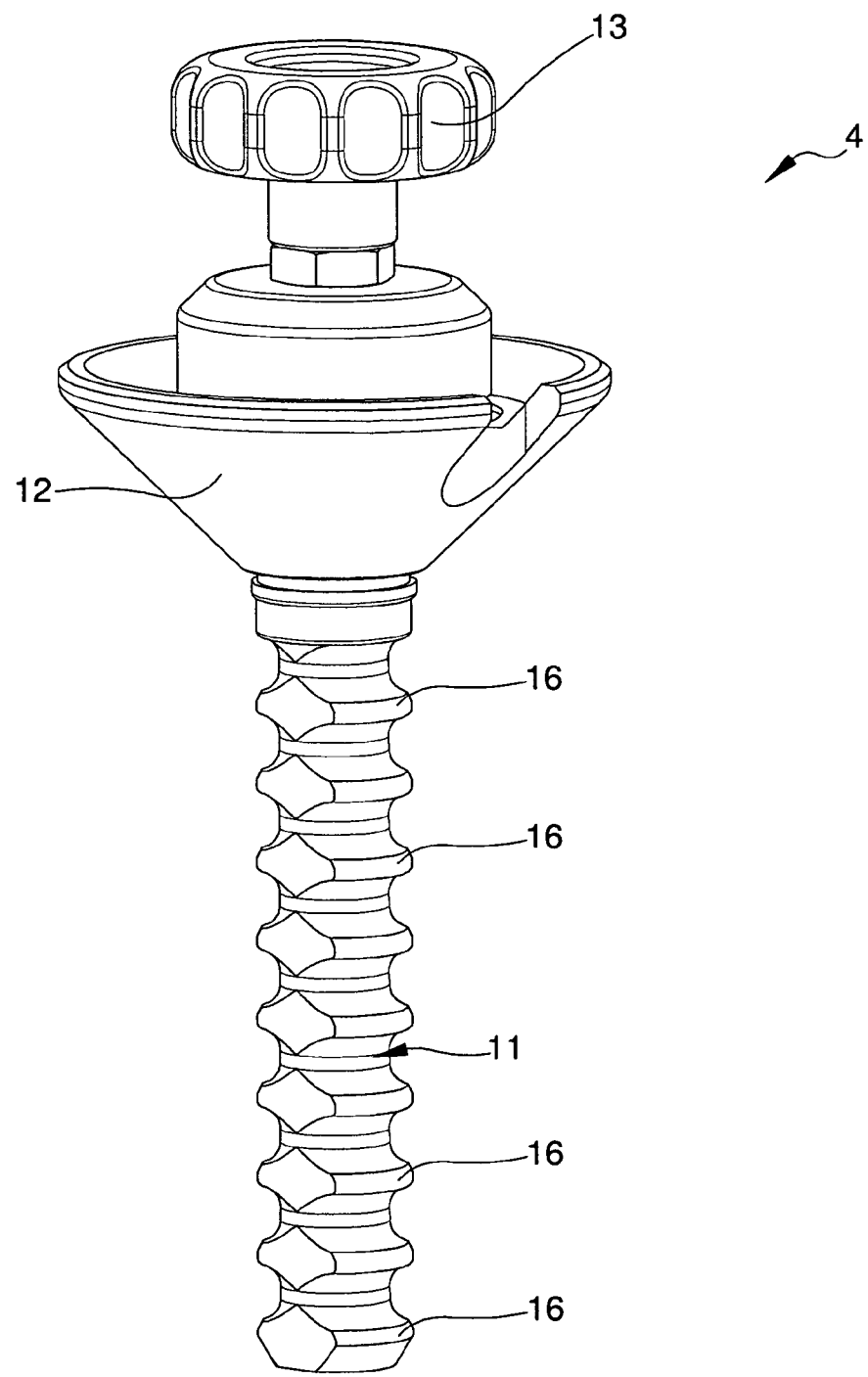
FIG. 6 is a perspective view of the locking element used in the device according to the invention.

The device 1 also comprises a locking element 4, illustrated in FIG. 6, associable in a removable way with a fastening element 5 on the supporting structure 2, and a movement arrangement suitable for moving the fastening element 5 from a release position, wherein the locking element 4 is disengaged from the rim of the wheel D (FIG. 3), to a retention position, wherein the locking element 4 is engaged on the rim (FIG. 5).

In such a retention position, therefore, the rim is fastened to the resting plate 3 and the wheel D can be placed in rotation by means of the rotation means of the machine A to make the traditional tire fitting/removal operations. The movement direction of the locking element 4 between the release position and the retention position is parallel to the work axis B.

Advantageously, with non exclusive reference to the embodiment of the device 1 shown in the figures, the above mentioned movement arrangement comprises:

a main actuator cylinder 6 with fluid operation and suitable for moving the locking element 4 from the release position to the retention position;

a first auxiliary actuator cylinder 7 with fluid operation and suitable for cooperating with the main actuator cylinder 6 to move the locking element 4 from the release position to the retention position; and a second auxiliary actuator cylinder 8 with fluid operation and suitable for cooperating with the main actuator cylinder 6 and with the first auxiliary actuator cylinder 7 to move the locking element 4 from the release position to the retention position.

Furthermore, the movement arrangement comprises:

a feeding mouth 9, connected to the main actuator cylinder 6 and suitable for introducing a fluid, of the type of air, oil or the like, and a transit channel, globally indicated by reference 10, suitable for allowing the transfer of the fluid introduced through the feeding mouth 9 from the main actuator cylinder 6 to the first auxiliary actuator cylinder 7 up to the second auxiliary actuator cylinder 8.

The use and the cooperation of the main and auxiliary actuator cylinders 6, 7 and 8, as well as their particular conformation and position, described in detail below, allow exercising a considerable force on the locking element 4 for the retention of the wheel D, while maintaining compact overall dimensions. Notwithstanding the embodiment of the device 1 described and shown in the illustrations contemplates the use of a main actuator cylinder 6 and of two auxiliary actuator cylinders 7 and 8, the use of a different number of actuator cylinders cannot however be ruled out.

The locking element 4 has en elongated shape and has an extremal section 11 associable in a removable way with the locking element 4. The locking element 4 also comprises a pressing element 12 with widened conformation and suitable for being placed in contact with the rim of the wheel D in the above retention position, for the retention of the rim on the resting plate 3. The pressing element 12, in particular, has a substantially truncated-cone shape and is arranged in the proximity of an extremity of the locking element 4, with the vertex turned towards the extremal section 11, coaxial with respect to the longitudinal axis of the locking element itself.

The particular truncated-cone conformation allows fitting the pressing element 12 inside the central hole of the rim for the locking thereof on the resting plate 3. Usefully, the locking element 4 has the extremity opposite the extremal section 11 provided with a grip handle 13 usable by the operator during the rim locking operation.

The resting plate 3 has an opening 14 for fitting the extremal section 11 of the locking element 4 and the rim can be positioned on the resting plate with the central hole arranged in correspondence to such opening 14. The fastening element 5 comprises a housing body 15 of the extremal section 11, when it is inserted through the opening 14, and coupling means between the extremal section 11 and the housing body 15.

The housing body 15 is supported by the supporting structure 2 and is sliding by action of the main and auxiliary actuator cylinders 6, 7 and 8, for the positioning of the locking element 4 from the release position to the retention position. Usefully, the above mentioned coupling means between the extremal section 11 and the housing body 15 can be of the bayonet type or the like.

With reference to the embodiment of the device 1 shown in the illustrations, such coupling means comprise at least a first shoulder 16 made on the outer surface of the extremal section 11 which can be coupled with a corresponding second shoulder 17 made on the inner surface of the housing body 15, in the proximity of the opening 14. Advantageously, the locking element 4 comprises a plurality of first shoulders 16, made along the extremal section 11 and suitably at a distance from one another. The presence of a plurality of first shoulders 16 that can be coupled with the second shoulder 17, in particular, allows positioning the locking element 4 in different positions inside the housing body 15 and, therefore, allows suitably distancing the truncated-cone pressing element 12 from the rim, before the movement towards the retention position, depending on the type and dimensions of the rim itself.

The main actuator cylinder 6 comprises a respective main piston 18 suitable for exercising a thrust on the fastening element 5, and a main inner chamber 19 connected to the fluid feeding mouth 9. The first auxiliary actuator cylinder 7 comprises a respective first auxiliary piston 20 suitable for exercising a thrust on the main piston 18 and a first auxiliary inner chamber 21 connected to the main inner chamber 19 through the transit channel 10.

In the same way, the second auxiliary actuator cylinder 8 comprises a respective second auxiliary piston 22 suitable for exercising a thrust on the first auxiliary piston 20, and therefore on the main piston 18, and a second auxiliary inner chamber 23 connected to the main inner chamber 19 through the transit channel 10. The transit channel 10, in particular, comprises suitable protrusions and/or recesses 24 made in correspondence to the contact surfaces between the main and auxiliary actuator cylinders 6, 7 and 8.

The liner of the main and auxiliary actuator cylinders 6, 7 and 8 is made up of an outer wall 25 and an inner wall 26 of the supporting structure 2. The transit channel 10, in particular, extends between the inner wall 26 and the main and auxiliary actuator cylinders 6, 7 and 8. The outer wall 25 and the inner wall 26 are substantially cylindrical and coaxial to one another. The inner wall 26 has, at one extremity, the resting plate 3 and, at the opposite extremity, attachment means 27 for attaching onto the rotation means of the machine A.

At the extremity opposite the resting plate 3, the outer wall 25 has an anchor plate 28 that can be fastened to the base C of the machine A. The inner wall 26, and therefore the resting plate 3, is axially rotatable with respect to the outer wall 25 by the action of the rotation means of the machine A. The housing body 15 has an elongated cylindrical shape and is fitted sliding to measure inside a channel delimited by the inner wall 26.

The main inner chamber 19 is delimited by the outer wall 25, by the main piston 18 and by a first separation element 29 placed between the main chamber itself and the first auxiliary inner chamber 21. A portion of the first auxiliary piston 20 is fitted sliding between the first separation element 29 and the inner wall 26 and has a thrust surface of the main piston 18. Usefully, the outer wall 25 has a first air vent hole 30 made between the first separation element 29 and the first auxiliary piston 20.

The first auxiliary inner chamber 21 is delimited by the outer wall 25, by the first auxiliary piston 20 and by a second sealed separation element 31 placed between the first auxiliary inner chamber itself and the second auxiliary inner chamber 23. A portion of the second auxiliary piston 22 is fitted sliding between the second separation element 31 and the inner wall 26 and has a thrust surface of the first auxiliary piston 20.

Usefully, the outer wall 25 has a second air vent hole 32 made between the second separation element 31 and the second auxiliary piston 22. The second auxiliary inner chamber 23 is delimited by the outer wall 25, the second auxiliary piston 22 and a sealed closing element 33.

Usefully, the movement arrangement comprises a supplementary actuator cylinder 34 with fluid operation, connected to a supplementary mouth 35 for feeding the fluid, of the air, oil type or the like, and suitable for returning the housing body 15 from the retention position to the release position, for releasing the rim from the resting plate 3 at the end of the operations performed on the wheel D.

The supplementary actuator cylinder 34 comprises a supplementary piston 36 for pushing the housing body 15. The supplementary actuator cylinder 34 also comprises a supplementary inner chamber 37 connected to the supplementary mouth 35 for feeding the fluid. The main piston 18 and the supplementary piston 36 are associated with the housing body 15 by means of the connection element 38. In particular, the connection element 38 is composed of a pin fastened integral at the extremity of the housing body 15 opposite the opening 14, whose extremities 39 are fitted sliding between the outer wall 25 and the inner wall 26 and are placed between the main piston 18 and the supplementary piston 36. The pin 38 is arranged crossways with respect to the housing body 15 and crosses it from one side to the other.

Usefully, with particular reference to the embodiment of the device 1 shown in the illustrations, the main, auxiliary and supplementary actuator cylinders 6, 7, 8 and 34 are positioned coaxially with respect to the work axis B, with the main and auxiliary actuator cylinders 6, 7, and 8 arranged in sequence starting with the connection element 38 towards the resting plate 3 and with the supplementary actuator cylinder 34 placed in the proximity of the anchor plate 28.

Figure 3:
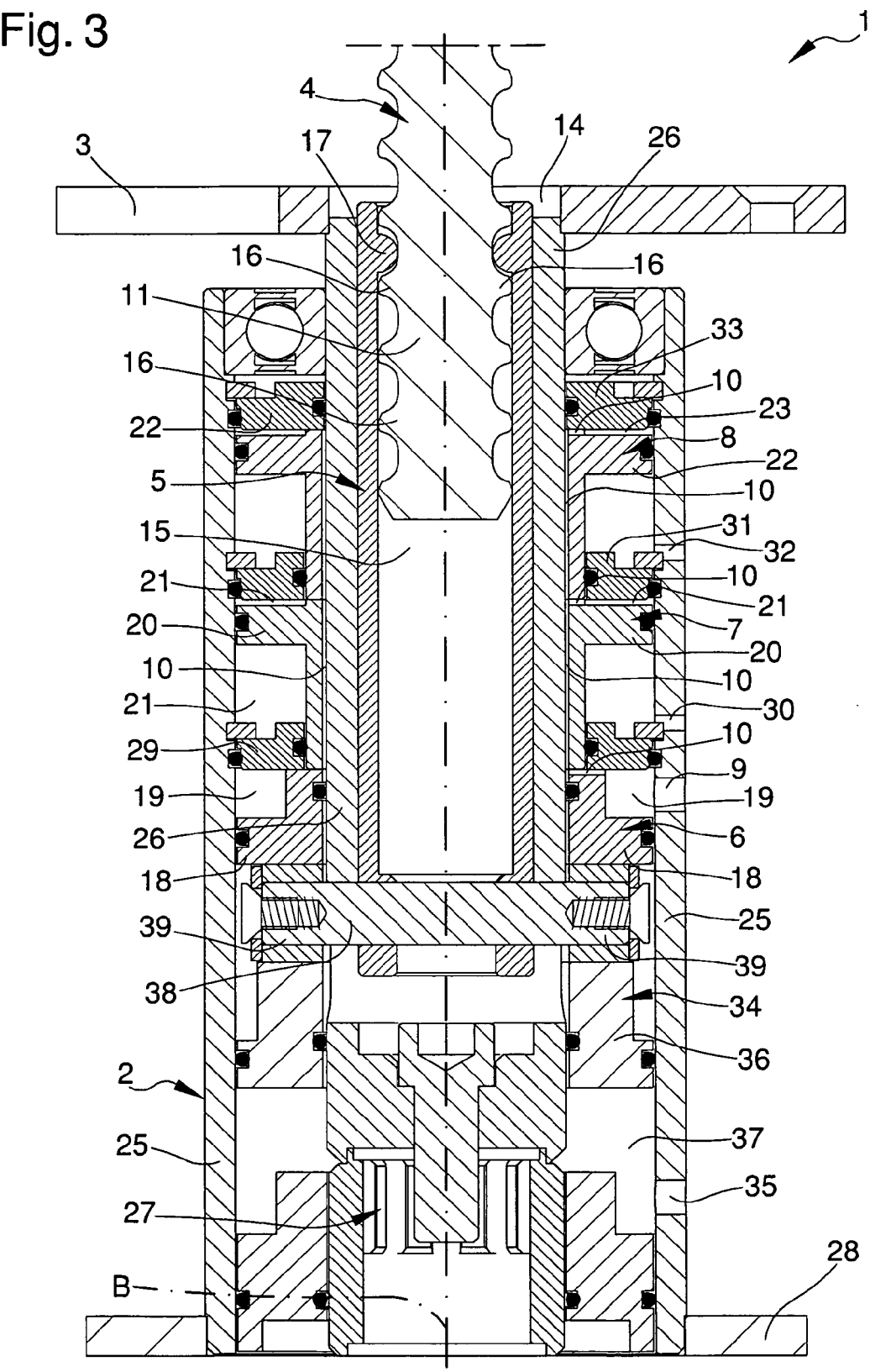
FIG. 3 is a side section view of the device according to the invention in the release position.

During use, an operator first of all positions the rim on the resting plate 3, with the central hole in correspondence to the opening 14. Subsequently, the operator fits the extremal section 11 of the locking element 4 inside the housing body 15, through the opening 14. During such operation, the housing body 15 is arranged in the release position (FIG. 3).

The extremal section 11 is fitted until the truncated-cone pressing element 12 is moved in the proximity of the rim, in correspondence to the central hole, and the locking element 4 is rotated until the coupling is achieved between one of the first shoulders 16 on the extremal section 11 and the second shoulder 17 inside the housing body 15. The portion of the extremal section 11 fitted inside the housing body 15 depends on the type and dimensions of the rim.

Figure 4:
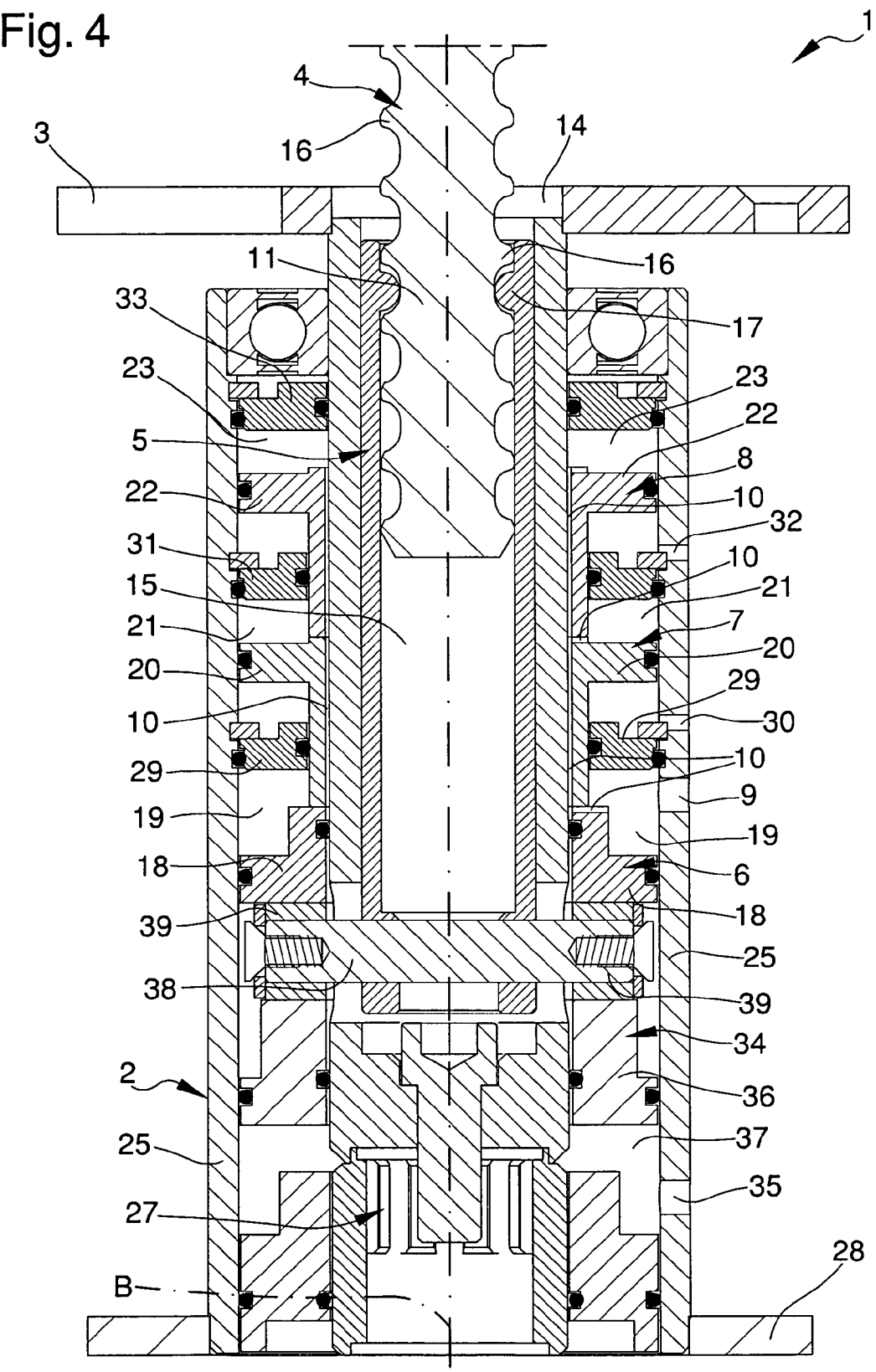
FIG. 4 is a side section view of the device according to the invention in an intermediate position between the release position and the retention position.

Subsequently, the fluid, of the compressed-air, oil type, or the like, is introduced through the feeding mouth 9 inside the main inner chamber 19 and reaches the first and the second auxiliary inner chamber 21 and 23 through the transit channel 10. The main piston 18 and the first and second auxiliary piston 20 and 22 carry out a thrust action on the extremities 39 of the pin 38 connected to the housing body 15, moving the housing body 15 and, consequently, the locking element 4, downwards as far as the retention position (FIGS. 4 and 5).

The movement of the locking element 4 downwards brings the truncated-cone pressing element 12 into contact with the rim inside the central hole, locking the rim itself on the resting plate 3. After the operations carried out on the wheel D, the locking element 4 is returned from the retention position to the release position operating the supplementary actuator cylinder 34.

It has in point of fact been ascertained how the described invention achieves the proposed objects. In particular, the fact is underlined that the presence of one or more auxiliary actuator cylinders suitable for cooperating with the main actuator cylinder allows applying the force needed to lock the wheel rim while maintaining compact overall dimensions.

What is claimed is:

1. A device for locking wheel rims for vehicles on repair workshop machines, particularly tire-changing machines or the like, comprising:
   at least one supporting structure rotatably positioned around a work axis with a repair workshop machine and having at least a resting portion for a wheel rim for vehicles;
   at least one locking element removably associated with at least one fastening element on said supporting structure, the fastening element surrounding the locking element; and
   at least one movement arrangement disposed within the supporting structure and comprising:
   a) a main actuator cylinder with fluid operation being configured for moving said fastening element from a release position wherein said locking element is disengaged from said rim, to a retention position wherein said locking element is engaged on said rim,
   b) at least one auxiliary actuator cylinder with fluid operation being configured for moving said fastening element from said release position to said retention position of the rim, the main actuator cylinder and at least one auxiliary actuator cylinder surrounding the fastening element, and c) a feeding mouth for a fluid, said feeding mouth being connected to at least one of said main actuator cylinder and said at least one auxiliary actuator cylinder.

2. The device according to claim 1, wherein said movement arrangement comprises a transit channel for the fluid introduced through said feeding mouth from said main actuator cylinder to said auxiliary actuator cylinder, or vice versa.

3. The device according to claim 2, wherein said main actuator cylinder comprises a main piston for pushing said fastening element.

4. The device according to claim 3, wherein said main actuator cylinder comprises a main inner chamber connected to said feeding mouth for the fluid.

5. The device according to claim 4, wherein said at least one auxiliary actuator cylinder comprises an auxiliary piston for pushing said main piston.

6. The device according to claim 5, wherein said at least one auxiliary actuator cylinder comprises an auxiliary inner chamber connected to said main inner chamber through said transit channel.

7. The device according to claim 1, wherein said movement arrangement comprises a plurality of said auxiliary actuator cylinders.

8. The device according to claim 1, wherein said resting portion comprises at least one opening for the insertion of an extremal section of said locking element, said rim being positionable on said resting portion with a central hole corresponding to said opening.

9. The device according to claim 8, wherein said fastening element comprises a housing body of said extremal section of the locking element, when it is inserted through said opening, and coupling means between said extremal section and said housing body.

10. The device according to claim 9, wherein said coupling means comprise bayonet latches.

11. The device according to claim 9, wherein said coupling means comprise at least one first shoulder made on an outer surface of said extremal section, said first shoulder being adapted to be coupled in a removable way to a respective second shoulder made on an inner surface of said housing body.

12. The device according to claim 11, wherein said locking element comprises a plurality of said first shoulders, made at a distance from one another along said extremal section.

13. The device according to claim 9, wherein said housing body slides on said supporting structure via said movement arrangement, for positioning said locking element between said release position and said retention position.

14. The device according to claim 13, wherein said housing body slides inside a channel delimited by an inner wall of said supporting structure.

15. The device according to claim 14, wherein a liner of said main and auxiliary actuator cylinders is delimited by at least one of an outer wall and said inner wall of said supporting structure.

16. The device according to claim 15, wherein said outer wall, said inner wall and said housing body are substantially cylinder-shaped and coaxial to one another.

17. The device according to claim 6, wherein at least a portion of said auxiliary piston slides inside said main inner chamber or another adjacent auxiliary inner chamber and has at least a thrust surface of said main piston or another auxiliary piston.

18. The device according to claim 1, wherein said movement arrangement comprises a supplementary actuator cylinder with fluid operation connected to a supplementary mouth for feeding a fluid and suitable for moving said fastening element from said retention position to said release position.

19. The device according to claim 18, wherein said supplementary actuator cylinder comprises a supplementary piston for pushing said fastening element.

20. The device according to claim 19, wherein said supplementary actuator cylinder comprises a supplementary inner chamber connected to said supplementary mouth for feeding the fluid.

21. The device according to claim 1, wherein the locking element comprises a pressing element with a substantially widened conformation, said locking element being adapted for contacting said rim in said retention position.

22. The device according to claim 1, wherein said locking element has a substantially elongated shape.

23. The device according to claim 1, wherein said pressing element has a substantially truncated-cone shape, with a vertex turned towards said extremal section and is substantially coaxial with respect to a longitudinal axis of said locking element.

24. The device according to claim 1, wherein said locking element has an extremity opposite said extremal section, said extremity being equipped with a grip handle.

\* \* \* \* \*